United States Patent
Wiatrowski et al.

(10) Patent No.: US 7,489,675 B2
(45) Date of Patent: Feb. 10, 2009

(54) METHOD FOR INDICATING PADDING IN A DIGITAL MOBILE RADIO SYSTEM

(75) Inventors: David G. Wiatrowski, Woodstock, IL (US); Dipendra M. Chowdhary, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 109 days.

(21) Appl. No.: 11/530,660

(22) Filed: Sep. 11, 2006

(65) Prior Publication Data

US 2007/0058565 A1 Mar. 15, 2007

Related U.S. Application Data (60) Provisional application No. 60/716,060, filed on Sep. 12, 2005.

(51) Int. Cl.
*H04J 3/24* (2006.01)

(52) U.S. Cl. ............... 370/349; 370/466; 370/474; 370/476

(58) Field of Classification Search ........... 370/395.1, 370/464, 465, 470, 471, 474, 476, 310.1, 370/349, 466, 469, 473, 505, 252; 714/755
See application file for complete search history.

(56) References Cited

U.S. PATENT DOCUMENTS

| | | | | |
|---|---|---|---|---|
| 5,802,051 A | * | 9/1998 | Petersen et al. | 370/395.42 |
| 6,470,033 B1 | * | 10/2002 | Menzi et al. | 370/505 |
| 6,738,369 B1 | | 5/2004 | Hippelainen | |
| 7,116,683 B1 | * | 10/2006 | Petersen et al. | 370/474 |
| 7,415,041 B2 | * | 8/2008 | Harris | 370/469 |
| 2003/0063569 A1 | * | 4/2003 | Kalliokulju et al. | 370/252 |
| 2003/0100321 A1 | * | 5/2003 | Rao et al. | 455/466 |
| 2003/0145229 A1 | * | 7/2003 | Cohen et al. | 713/201 |
| 2003/0188247 A1 | * | 10/2003 | Ahmed et al. | 714/755 |
| 2004/0213291 A1 | * | 10/2004 | Beshai et al. | 370/473 |
| 2005/0068981 A1 | * | 3/2005 | Park et al. | 370/466 |
| 2006/0007953 A1 | * | 1/2006 | Vesma et al. | 370/466 |
| 2008/0123620 A1 | * | 5/2008 | Ko et al. | 370/349 |

* cited by examiner

*Primary Examiner*—Hassan Kizou
*Assistant Examiner*—Jeffrey M Rutkowski
(74) *Attorney, Agent, or Firm*—Valerie M. Davis (57) ABSTRACT

A method for indicating padding in a digital mobile radio is disclosed. The method comprises receiving a packet comprising a header and a defined length blocks portion. The defined length blocks portion comprises payload and a padding portion. The padding portion comprises padding and a payload pad count field. The method further indicates by a pad field in the header to examine the payload pad count field to determine an amount of padding for the padding portion of the defined length blocks portion. The method further indicates an amount of padding for the padding portion in the payload pad count field.

20 Claims, 6 Drawing Sheets

|  | 7 | 6 | 5 | 4 | 3 | 2 | 1 | 0 |
|---|---|---|---|---|---|---|---|---|
| OCTET 0 | G/I | A | AB --- | | FORMAT = 1101 | | | |
| OCTET 1 | SAP | | | | --- AB | | | |
| OCTET 2 | TARGET ADDRESS | | | | | | | |
| OCTET 3 | | | | | | | | |
| OCTET 4 | | | | | | | | |
| OCTET 5 | SOURCE ADDRESS | | | | | | | |
| OCTET 6 | | | | | | | | |
| OCTET 7 | | | | | | | | |
| OCTET 8 | SOURCE PORT | | | | DEST PORT | | SARQ | F |
| OCTET 9 | DD FORMAT & MINIMUM PADDING | | | | | | | |
| OCTET 10 | HEADER CRC | | | | | | | |
| OCTET 11 | | | | | | | | |

FIG. 7

METHOD FOR INDICATING PADDING IN A DIGITAL MOBILE RADIO SYSTEM

FIELD OF THE INVENTION

The present invention relates generally to digital mobile radio systems and more specifically to the field of indicating padding in a digital mobile radio system.

BACKGROUND OF THE INVENTION

The proposed European Telecommunications Standards Institute (ETSI) standard for Digital Mobile Radio (DMR) describes a packet data protocol. In this protocol, each packet comprises a header and defined length blocks portion carrying data (also referred to herein as "payload"). In the proposed ETSI-DMR standard, the header needs to indicate a format of the packet's payload (e.g. 24 bit addresses, 16 bit words, 8 bit words, etc.) and the padding that may be added to the packet to maintain the defined length of the block. However, there are only a limited number of bits in the header to be able to indicate the format of the packet and to indicate the padding that may be required.

One option is to increase the header size so as to accommodate the need to indicate the format of the packet and to indicate the padding that may be required. However, increasing the header size increases the length of the packet and, consequently, increases the amount of time spent using the wireless resource. Further, increasing the amount of time spent using the wireless resource may be an inefficient use of the DMR system and may lead to decreased system capacity.

Thus, there is a need for an improved method of indicating padding in a digital mobile radio system.

BRIEF DESCRIPTION OF THE FIGURES

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
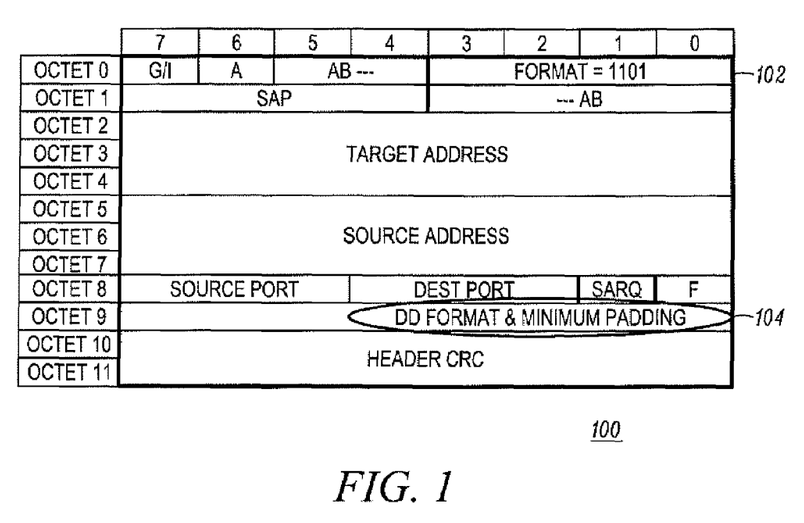
FIG. 1 illustrates a short data header in accordance with an embodiment of the present invention.
Figure 2A:
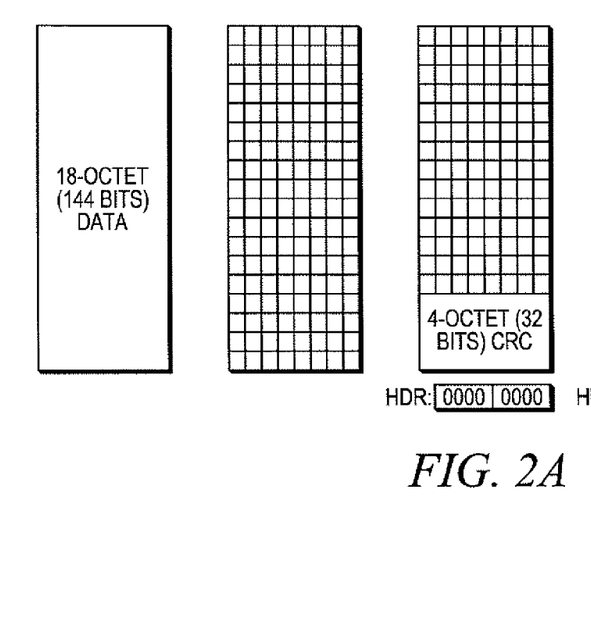
FIG. 2 illustrates examples of binary format payload in accordance with an embodiment of the present invention.
Figure 2B:
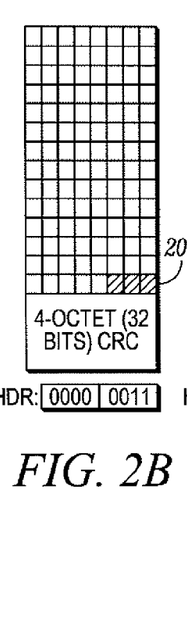
Figure 2C:
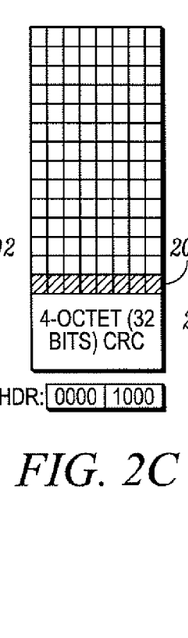
Figure 2D:
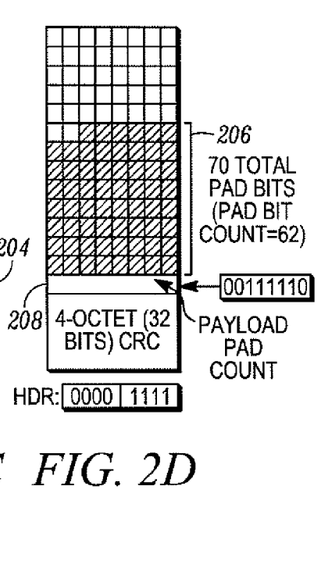

FIG. 1 is a block diagram graphically illustrating a short data header 100 to transmit data (also termed "payload") in accordance with one embodiment of the present invention. The short data header 100 comprises a format field 102 and a defined data (DD) format and minimum padding field (the latter two collectively termed "pad field") 104. The short data header 100 contains other parameters that describe a short data service for sending data from one DMR entity, e.g. a mobile station, to another DMR entity, e.g. another mobile station. In one embodiment, the short data header 100 adheres to the ETSI DMR standard, and, as such, the header is one defined block in length.

Further, in one embodiment, the short data header 100 is used for sending small amounts of data, e.g. up to 1130 bytes of data, between DMR entities, wherein the data is sent as packets. Each packet comprises the short data header 100 followed by defined length blocks carrying data (as mentioned above, also termed "payload"), padding, a payload pad count field, and a cyclic redundancy check (CRC) where the defined length blocks is collectively called the defined length blocks portion. Further, as used herein, the padding and the payload pad count field collectively make up a padding portion. In one embodiment, the last defined length block of the defined length blocks portion has a CRC that serves as a check over the defined length blocks portion. Because the defined length blocks are of a defined length and the payload may not be of a defined length, the payload may need to be padded by unused bits (also termed "pad bits") to bring either a last block or a second to last block to a defined length, e.g. a predetermined length that may be defined in a standard. For example, the payload may take up three complete blocks and a portion of a fourth block. In such a case, the fourth block is padded to form a complete block.

In one embodiment, the format field 102 defines the type of message. For example, the format field 102 may define a short data service where the format field 102 is set to indicate the short data service. In one embodiment, the format field 102 is set to "1101" to indicate the short data service. In such an embodiment, defined length data messages are received and transmitted between DMR entities in the digital mobile radio system to facilitate the short data service.

In one embodiment, the pad field 104 is a fixed length field that indicates the data format (also termed DD format portion) and an amount of padding (minimum padding portion) contained in the defined length blocks portion. In one embodiment, the length of the pad field 104 is 8 bits. As such, the DD format portion plus the minimum padding portion total 8 bits. In another embodiment, the length of the pad field 104 is 5 bits. As such, the DD format portion plus the minimum padding portion total 5 bits. In any case, DD format portion and the minimum padding portion of the pad field 104 are of variable length.

In the embodiment that the pad field 104 is 8 bits, the following table illustrates the variable nature of the DD format portion and the minimum padding portion of the pad field 104 and how the bits in the 8 bit pad field 104 are allocated to indicate the DD format portion and the minimum padding portion.

|  | 8 bit Pad Field 104 | | | | | | | |
|---|---|---|---|---|---|---|---|---|
| Type of | DD Format | | | | Minimum Padding | | | |
| Data | Bit 7 | Bit 6 | Bit 5 | Bit 4 | Bit 3 | Bit 2 | Bit 1 | Bit 0 |
| Binary | 0 | 0 | 0 | 0 | 4 bits | | | |
| BCD | 0 | 0 | 0 | 1 | 0 | 0 | 2 bits | |
| 7 bit character | 0 | 0 | 0 | 1 | 0 | 1 | 2 bits | |
| 8 bit character | 0 to 1 | 0 | 0 | 1 | 1 | 0 | 0 | 1 bit |
| 16 bit character | 1 to 1 | 0 | 0 | 1 | 1 | 0 | 1 | 1 bit |
| 24 bit character | 1 | 1 | 0 | 1 | 1 | 1 | 0 | 1 bit |

Referring to the above table, for example, if the payload is defined as a binary format, then four bits (namely bits 7-4) of the pad field 104 are used for the DD format portion to indicate a binary format and four bits (namely bits 3-0) are used for the minimum padding portion to indicate padding in the defined length blocks portion. In one embodiment, the four bits 7-4 "0000" indicate a binary format.

Further, referring to the above table, for example, if the payload is defined as a binary coded decimal (BCD) format, then six bits 7-2 of the pad field 104 are used for the DD format portion to indicate that the payload is defined in a BCD format and two bits 1-0 are used for the minimum padding portion to indicate padding in the defined length blocks portion. In one embodiment, the six bits 7-2 "000100" indicate a BCD format.

Further yet, referring to the above table, for example, if the payload is defined as a 7 bit character format, then six bits 7-2 of the pad field 104 are used for the DD format portion to indicate that the payload is defined in a 7 bit character format and two bits 1-0 are used for the minimum padding portion to indicate padding in the defined length blocks portion. In one embodiment, the six bits 7-2 "000101" indicate a 7 bit character format.

Further yet, referring to the above table, for example, the pad field may be used to indicate up to 65 different 8 bit character formats by using seven bits 7-1 of the pad field 104 for the DD format portion to indicate a specific 8 bit character format. For example, the seven bits 7-1 "0001100" may indicate a first 8 bit character format and the seven bits 7-1 "0001101" may indicate a second 8 bit character format. In any case, one bit 0 is used for the minimum padding portion to indicate padding in the defined length blocks portion. In one embodiment, the 8 bit character formats refer to character sets defined by International Standards Organization (ISO) 8859.

Further yet, referring to the above table, for example, the pad field may be used to indicate up to 33 different 16 bit character formats by using seven bits 7-1 of the pad field 104 for the DD format portion to indicate a specific 16 bit character format. For example, the seven bits 7-1 "1001101" may indicate a first 16 bit character format and the seven bits 7-1 "1001110" may indicate a second 16 bit character format. In any case, one bit 0 is used for the minimum padding portion to indicate padding in the defined length blocks portion. Finally, referring to the above table, for example, if the payload is defined as a 24 bit character format, then seven bits 7-1 of the pad field 104 are used for the DD format portion to indicate that the payload is defined in a 24 bit character format and one bit 0 is used for the minimum padding portion to indicate padding in the defined length blocks portion. In one embodiment, the seven bits 7-1 "1101110" indicate 24 bit character format.

As mentioned above, the minimum padding portion of the pad field 104 is used to indicate padding in the defined length blocks portion. As such, the minimum padding portion either a) indicates the number of words of a type defined in the DD format portion that are padded in the defined length blocks portion or b) indicates to examine a last octet (also termed a payload pad count field) preceding a CRC field of the defined length blocks portion to determine padding in the defined length blocks portion. In one embodiment, indicating to examine the payload pad count field to determine the number of bits that are padded in the defined length blocks portion is termed "extended padding."

In one embodiment, the extended padding indicates to examine the payload pad count field, where the payload pad count field indicates a number of pad bits in the defined length blocks portion. In another embodiment, the extended padding indicates to examine the payload pad count field, where the payload pad count field indicates a number of pad words in the defined length blocks portion. In one embodiment, the minimum padding portion is set to indicate extended padding where the padding is indicated in the payload pad count field (as mentioned above) and the minimum padding portion does not indicate the number of words of a type defined in the DD format portion that are padded in the defined length blocks portion.

For example, if the DD format portion of the pad field 104 indicates BCD format (namely bits 7-2 are "000100") then the minimum padding portion of the pad field 104 (namely two bits 1-0) indicates the padding in the defined length blocks portion by a) indicating the number of words in BCD format that are padded in the defined length blocks portion and/or b) indicating extended padding, namely to examine the payload pad field in the defined length blocks portion In one embodiment, if the number of pad words can not be indicated by the minimum padding portion of the pad field 104 then extended padding by the payload pad count field is used to indicate the number of pad bits in the defined length blocks portion. In one embodiment, extended padding is indicated by setting the minimum padding of the pad field 104 to a value of "ones" to indicate to examine the payload pad count field to find the number of pad bits in the defined length blocks portion. For example, for a binary format payload, the four bits (namely bits 3-0) are set to "1111" to indicate to examine the payload pad count field to find the number of pad bits in the defined length blocks portion. For example, for a BCD format payload, the two bits 1-0 are set to "11" to indicate to examine the payload pad count field to find the number of pad bits in the defined length blocks portion. For example, for a 7 bit character format payload, the two bits 1-0 are set to "11" to indicate to examine the payload pad count field to find the number of pad bits in the defined length blocks portion. For example, for either the 8 bit character format, 16 bit character format, or the 24 bit character format payload, the one bit 0 is set to "1" to indicate to examine the payload pad count field to find the number of pad bits in the defined length blocks portion.

Referring to FIG. 2 and to the example of binary format payload, shown is an example of indicating padding. Referring to FIG. 2A, if the four bits 3-0 indicate a value of zero (namely "0000"), then there are no pad words in the defined length blocks portion. Referring to FIG. 2B, if the four bits 3-0 indicate a value of three (namely "0011"), then there are three words of padding in the defined length blocks portion. As such, three bits (namely three words in binary format) of padding 202 are shown in FIG. 2B. Referring to FIG. 2C, if the four bits 3-0 indicate a value of eight (namely "1000"), then there are eight words of padding in the defined length blocks portion. As such, eight bits (namely eight words in binary format) of padding 204 are shown in FIG. 2C. Referring to FIG. 2D, there are 70 words of padding 206 that need to be indicated but can not be indicated with the four bits 3-0 of the pad field 104. Thus, extended padding is indicated by the four bits 3-0 of the pad field 104 set to a value of ones (namely "1111") to indicate to examine the payload pad count field 208 in the payload to find a number of pad bits in the defined length blocks portion. Referring to FIG. 2D, the payload pad count field 208 in the defined length blocks portion has a value of 62 (namely "00111110") to indicate the 62 bits padding. Notice that 62 bits padding plus the payload pad count field (eight words) together comprise the padding portion for the defined length blocks portion. Thus, an embodiment of the present invention uniquely utilizes a previously unused portion of the defined length blocks portion to indicate a number of bits of padding for the defined length blocks portion itself.

Figures 3A, 3B:
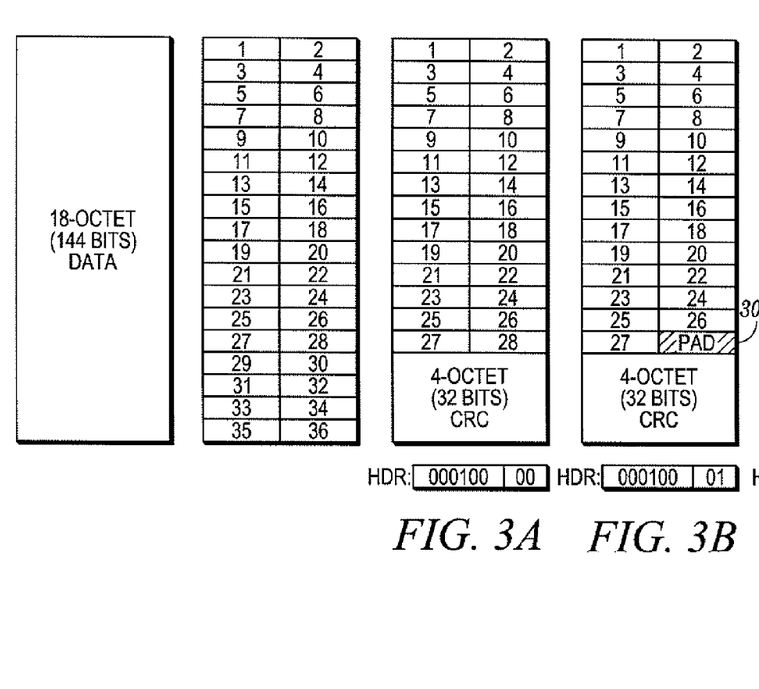
FIG. 3 illustrates examples of BCD format payload in accordance with an embodiment of the present invention.
Figure 3C:
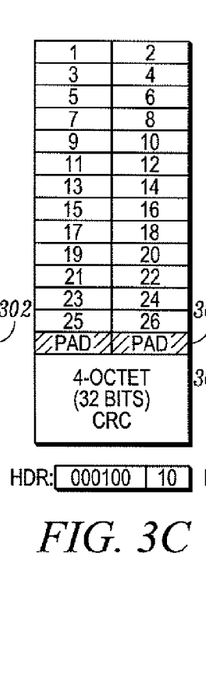
Figure 3D:
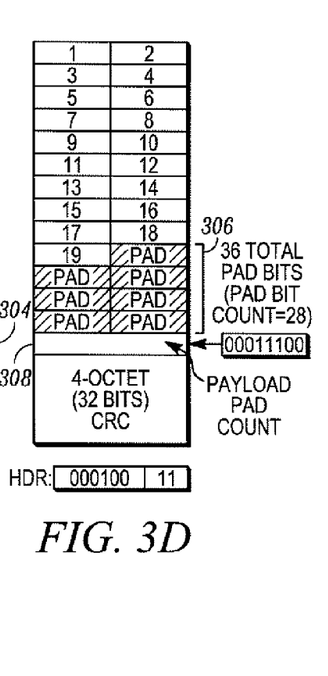

Referring to FIG. 3 and to the example of BCD format payload, shown is an example of indicating padding. Referring to FIG. 3A, if the two bits 1-0 indicate a value of zero (namely "00"), then there are no pad words in the defined length blocks portion. Referring to FIG. 3B, if the two bits 1-0 indicate a value of one (namely "01"), then there is one word of padding in the defined length blocks portion. As such, four bits (namely one word in BCD format) of padding 302 are shown in FIG. 3B. Referring to FIG. 3C, if the two bits 1-0 indicate a value of two (namely "10"), then there are two words of padding in the defined length blocks portion. As such, eight bits (namely two words in BCD format) of padding 304 are shown in FIG. 3C. Referring to FIG. 3D, there are nine words of padding 306 that need to be indicated but can not be indicated with the two bits 1-0 of the pad field 104. Thus, extended padding is indicated by the two bits 1-0 of the pad field 104 set to a value of ones (namely "11") to indicate to examine the payload pad count field 308 in the payload to find a number of pad bits in the defined length blocks portion. Referring to FIG. 3D, the payload pad count field 308 in the defined length blocks portion has a value of twenty eight (namely "00011100") to indicate the nine word padding. Notice that the payload ends at word 19 and that the seven word padding plus the payload pad count field (two words) together comprise the padding portion for the defined length blocks portion. Thus, an embodiment of the present invention uniquely utilizes a previously unused portion of the defined length blocks portion to indicate a number of bits of padding for the defined length blocks portion itself.

Figure 4A:
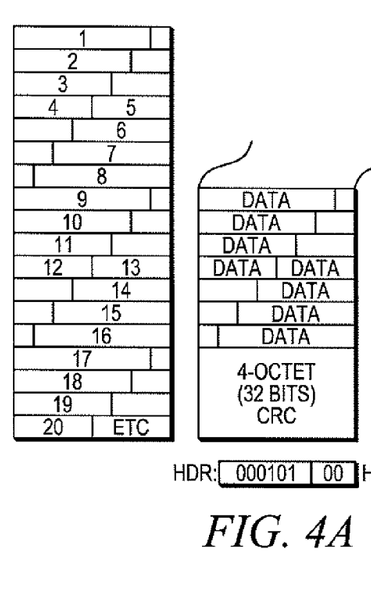
FIG. 4 illustrates examples of 7 bit character payload in accordance with an embodiment of the present invention.
Figure 4B:
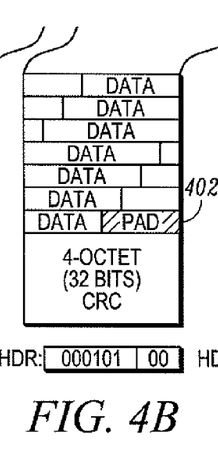
Figures 4C, 4D, 4E:
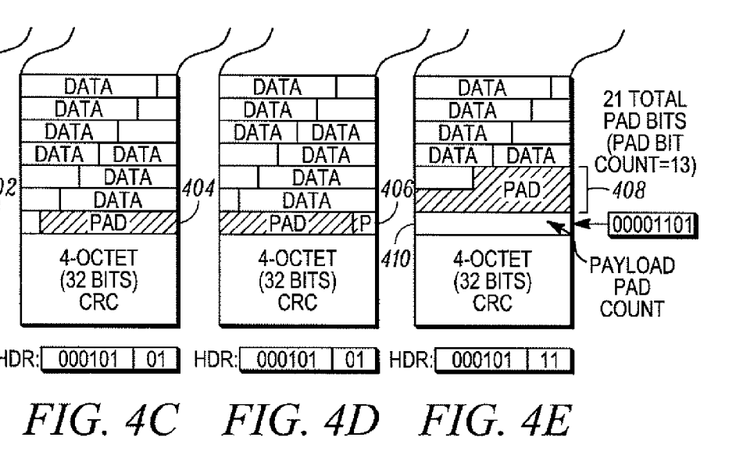

Referring to FIG. 4 and to the example of 7 bit character format payload, shown is an example of indicating padding. Referring to FIG. 4A, if the two bits 1-0 indicate a value of zero (namely "00") and data ended at a word boundary, then there are no pad bits in the defined length blocks portion. Referring to FIG. 4B, if the two bits 1-0 indicate a value of zero (namely "00") and data ended before a word boundary, then there is padding in the defined length blocks portion to the end of the word boundary. As such, four bits of padding 402 are shown in FIG. 4B. Referring to FIG. 4C, if the two bits 1-0 indicate a value of one (namely "01") and data did end at a word boundary, then there is one word of padding in the defined length blocks portion. As such, seven bits (namely one word in 7 bit character format) of padding 404 are shown in FIG. 4C. Referring to FIG. 4D, if the two bits 1-0 indicate a value of one (namely "01") and data did not end at a word boundary, then there is one word of padding plus an extra bit in the defined length blocks portion. As such, eight bits (namely one word in 7 bit character format plus one bit) of padding 406 are shown in FIG. 4D. Referring to FIG. 4E, there are 21 bits of padding 408 that need to be indicated but can not be indicated with the two bits 1-0 of the pad field 104. Thus, the two bits 1-0 of the pad field 104 are set to a value of ones (namely "11") to indicate to examine the payload pad count field 410 in the defined length blocks portion to find a number of pad bits in the defined length blocks portion. Referring to FIG. 4E the payload pad count field 410 in the defined length blocks portion has a value of 13 (namely "00001101") to indicate the 13 bits of padding. Notice that the 13 bits padding plus the payload pad count field together comprise the padding portion for the defined length blocks portion. Thus, an embodiment of the present invention uniquely utilizes a previously unused portion of the defined length blocks portion to indicate a number of bits of padding for the defined length blocks portion itself.

Figure 5:
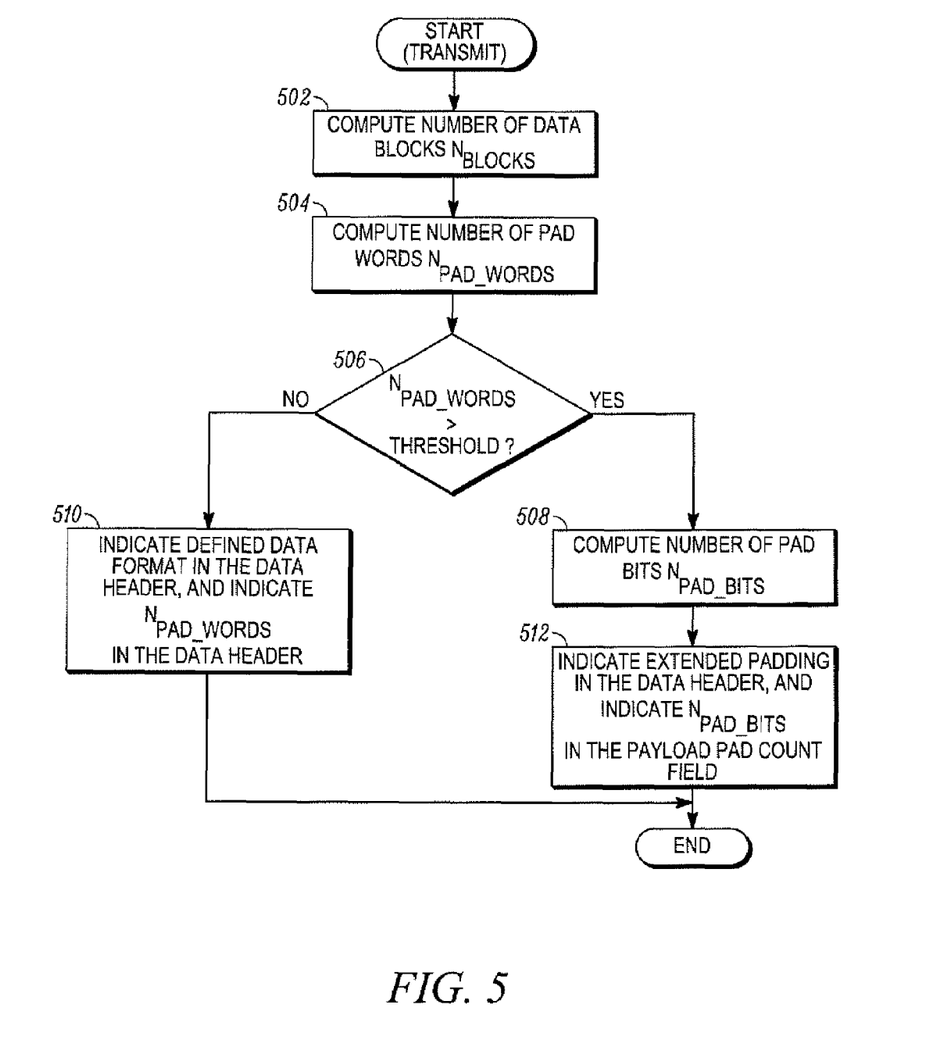
FIG. 5 is a flow diagram illustrating an example method of indicating padding in accordance with an embodiment of the present invention.

In operation, illustrated in FIG. 5 is a method that a DMR entity, e.g. a mobile station, uses to indicate padding in an embodiment of the present invention. For example, the DMR entity sending payload to another DMR entity needs to put together packets comprising a header and defined length blocks, where the defined length blocks may be padded. At step 502, the DMR entity computes a number of data blocks, $N_{Blocks}$, for a given payload. If the payload is described by the number of data words needing to be transmitted, namely $N_{Words}$, then the DMR entity computes $N_{Blocks}$ as follows:

$$N_{Blocks} = \left\lceil \left( N_{Words} \times N_{\frac{bits}{word}} + N_{\frac{bits}{CRC}} \right) \div N_{\frac{bits}{block}} \right\rceil \quad \text{Equation 1}$$

In the above equation, the DMR entity takes the mathematical ceiling of the above equation, which takes the user payload ($N_{Words}$), multiplies it by the DD Format (described as $N_{bits/word}$), adds the number of bits for the CRC ($N_{bits/CRC}$), and divides by the number of bits per block for the given Forward Error Correction (FEC) coding and delivery type ($N_{bits/block}$).

At step 504, the DMR entity computes a number of pad words, $N_{pad\_words}$, for the computed number of data blocks, namely $N_{Blocks}$. In one embodiment, the DMR entity computes $N_{pad\_words}$ as follows:

$$N_{Pad\_Words} = \left\lfloor \left( N_{Blocks} \times N_{\frac{bits}{block}} - N_{\frac{bits}{CRC}} \right) \div N_{\frac{bits}{word}} \right\rfloor - N_{Words} \quad \text{Equation 2}$$

In the above equation, the DMR entity takes the mathematical floor of the number of data blocks ($N_{Blocks}$), multiplied by the number of bits per block for the given FEC coding and delivery type ($N_{bits/block}$), subtracted by the number of bits for the CRC ($N_{bits/CRC}$), and divided by the DD Format (described by $N_{bits/word}$), and then subtracts the user payload ($N_{Words}$) to determine the number of pad words ($N_{pad\_words}$).

At step 506, if the number of pad words ($N_{pad\_words}$) is not greater than a threshold, then the DMR entity indicates the number of pad words in the minimum padding portion of the short data header 100 (step 510). Otherwise, the DMR entity computes the number of pad bits (Npad_bits) and indicates in the minimum padding portion of the short data header 100 to examine the payload pad count field of the defined length blocks portion for the number of pad bits (steps 508, 512).

With reference to the threshold, in one embodiment, the threshold relates to a largest number that the minimum padding portion of the pad field 104 can indicate. As such, for a binary format payload, since the minimum padding portion is 4 bits in length, the largest amount of padding that can be indicated with 4 bits is 15 binary format words and the threshold is set to 8 because that is the most binary format words that may appear in the payload pad count field 208. As such, for a BCD format or a 7 bit character payload, since the minimum padding portion is 2 bits in length, the largest amount of padding that can be indicated with 2 bits is 3 BCD or 7-bit character format words and the threshold is set to 2 because that is the most BCD or 7-bit character format words that may appear in the payload pad count field 308, 410. As such, for an 8 bit character format, a 16 bit character format, or a 24 bit character format payload, since the minimum padding portion is 1 bit in length, the largest amount of padding that can be indicated with 1 bit is 0 8-bit, 16-bit, 24-bit format words and the threshold is set to 0 because no 8-bit, 16-bit, 24-bit format words may appear in the payload pad count field.

At step 508, the DMR entity computes a number of pad bits, $N_{pad\_bits}$, for the computed number of data blocks, namely $N_{Blocks}$. In one embodiment, the DMR entity computes $N_{pad\_bits}$ as follows:

$$N_{pad\_Bits} = \left(N_{Blocks} \times N_{\frac{bits}{block}} - N_{\frac{bits}{CRC}}\right) - \left(N_{Words} \times N_{\frac{bits}{word}}\right) - N_{\frac{bits}{payload\ pad\ count}} \quad \text{Equation 3}$$

In the above equation, the DMR entity takes the number of data blocks ($N_{Blocks}$), multiplies by the number of bits per block for the given FEC coding and delivery type ($N_{bits/block}$), subtracts by the number of bits for the CRC ($N_{bits/CRC}$), subtracts by the number bits in the payload ($N_{Words}$ * $N_{bits/word}$), and subtracts by the number of bits in the payload pad count field ($N_{bits/payload\ pad\ count}$) to determine the number of pad bits. In one embodiment, $N_{bits/payload\ pad\ count}$ is set to 8, since the payload pad count field is 8 bits in length. However, other payload pad count field lengths may be used, e.g. 16 bits. In any case, this value is placed in the payload pad count field which is part of the defined length blocks portion.

At step 512, the DMR entity indicates the number of pad bits in the payload pad count field and sets the minimum padding portion of the pad field 104 to examine the payload pad count field for the padding of the defined length blocks portion. Further, the computed values are used to create a packet of the defined blocks.

With reference to the above equations, in one embodiment, the number of bits in the CRC field is 32. As such, $N_{bits/CRC}$ is set to 32. For example, for the ETSI DMR standard, the CRC field is defined to be 32 bits.

With reference to the above equations, in one embodiment, the number of bits per block for a ½ rate Forward Error Correction (FEC) coding with unconfirmed delivery is 96. As such, $N_{bits/block}$ is set to 96. The number of bits per block for a ½ rate FEC coding with confirmed delivery is 80. As such, $N_{bits/block}$ is set to 80. The number of bits per block for a ¾ rate FEC coding with unconfirmed delivery is 144. As such, $N_{bits/block}$ is set to 144. The number of bits per block for a ¾ rate FEC coding with confirmed delivery is 128. As such, $N_{bits/block}$ is set to 128.

With reference to the above equations, in one embodiment, the number of bits per word ($N_{bits/word}$) relates to the DD format portion of the pad field 104. As such, for a binary format payload, $N_{bits/word}$ is set to 1. As such, for a BCD format payload, $N_{bits/word}$ is set to 4. As such, for a 7 bit character format payload, $N_{bits/word}$ is set to 7. As such, for an 8 bit character format payload, $N_{bits/word}$ is set to 8. As such, for a 16 bit character format payload, $N_{bits/word}$ is set to 16. As such, for a 24 bit character format payload, $N_{bits/word}$ is set to 24.

Figure 6:
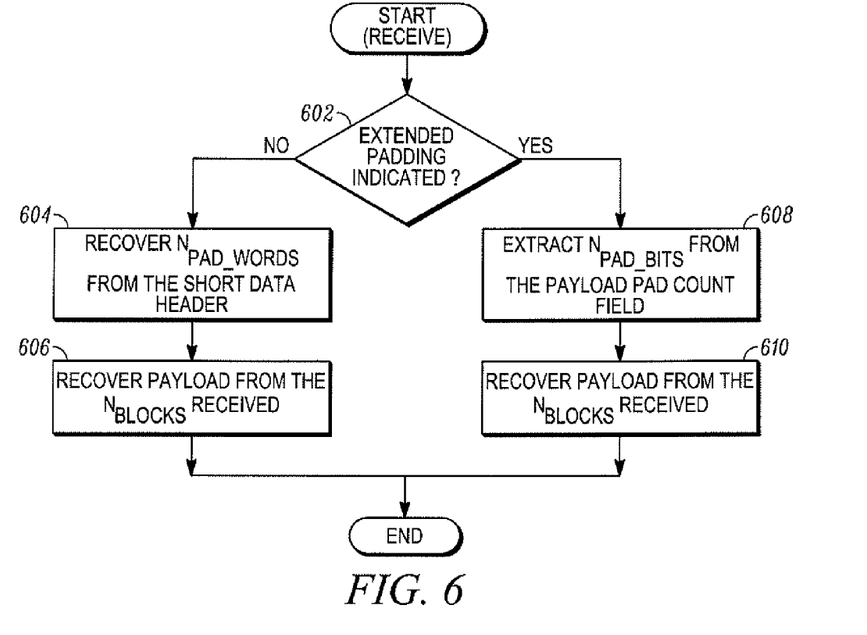
FIG. 6 is a flow diagram illustrating an example method of recovering payload in accordance with an embodiment of the present invention.

In operation, illustrated in FIG. 6 is a method that a DMR entity, e.g. a mobile station, utilizes padding in an embodiment of the present invention. For example, the DMR entity receiving payload from another DMR entity needs to retrieve payload from the received packets, where defined length blocks of the packets may be padded. At step 602, the DMR entity determines whether extended padding is indicated in the minimum padding portion of the pad field 104 of the short data header 100 or in the payload pad count field in the defined length blocks portion by examining the minimum padding portion of the pad field 104. As mentioned above, if the minimum padding portion indicates to examine the payload pad count field in the defined length blocks portion, by, e.g. indicating a value of ones, then the DMR entity extracts the number of pad bits ($N_{pad\_bits}$) from the payload pad count field (step 608) and recovers the payload from the blocks received ($N_{Blocks}$) (step 610). However, if the minimum padding portion contains the number of pad words, then the DMR entity extracts the number of pad words ($N_{pad\_words}$) from the minimum padding portion of the pad field 104 (step 604) and recovers the payload from the blocks received ($N_{Blocks}$) (step 606).

In the above equations a number of variables are used. However, as is known to one of ordinary skill in the art, there are many mathematical variations to the variables listed above and such variations are considered to be equivalent to the above listed variables.

Figure 7:
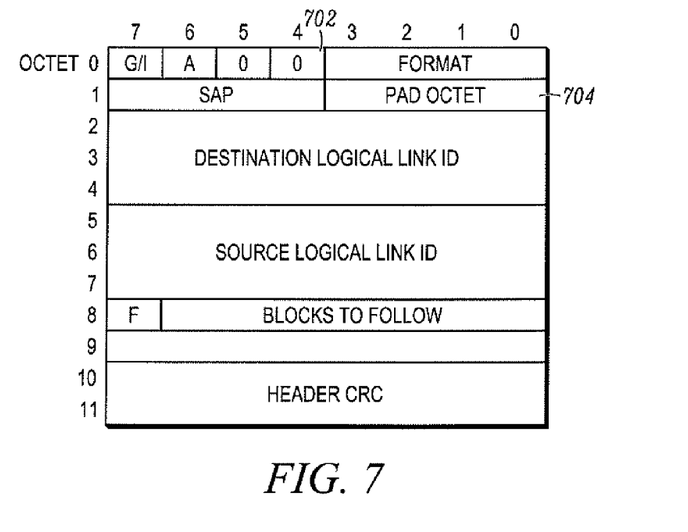
FIG. 7 illustrates an alternative header in accordance with an embodiment of the present invention.

Referring to FIG. 7, in an alternate embodiment, one bit in a header block is used to indicate that a number of pad bits is indicated in a defined length blocks portion, e.g. the payload pad count field. For example, any one bit in the short data header 100 may be used to indicate that the number of pad bits is indicated in the payload pad count field. In the embodiment of FIG. 7, bit 4 of octet 0 (namely field 702) is used to indicate whether the payload pad count field is used to indicate the number of pad bits in the defined length blocks portion. For example, if field 702 is set to "1" then the number of pad bits is indicated in the payload pad count field. If field 702 is cleared (namely set to "0"), then the padding is indicated by a pad octet field 704. Further, as mentioned above, in an alternate embodiment, the pad field 104 may always indicate extended padding and may indicate to examine the payload pad count field, where the payload pad count field indicates the padding in the defined length blocks portion. Further, in an alternate embodiment, the short data header 100 does not indicate padding of the defined length blocks portion and padding of the defined length blocks portion is only indicated in the defined length blocks portion, e.g. by the payload pad count field.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for indicating padding in a digital mobile radio system, wherein the method comprises:
   creating a packet comprising a header and a defined length blocks portion, wherein the defined length blocks portion comprises payload and a padding portion, and wherein the padding portion comprises padding and a payload pad count field;
   comparing an amount of padding for the padding portion to a threshold that is determined based on a format of the payload;
   when the amount of padding exceeds the threshold, indicating by a pad field in the header to examine the payload pad count field to determine the amount of padding for the padding portion;
   indicating an amount of padding for the padding portion in the payload pad count field; and
   transmitting the packet.

2. The method of claim 1 wherein the payload pad count field comprises the last octet preceding a cyclic redundancy check field of the defined length blocks portion.

3. The method of claim 1 wherein a minimum padding portion of the pad field indicates to examine the payload pad count field.

4. The method of claim 3 wherein a minimum padding portion indicates to examine the payload pad count field by a value of binary ones.

5. The method of claim 1 wherein the amount of padding is a number of pad bits that are required to bring the defined length blocks portion to become a predetermined length.

6. The method of claim 1 further comprising:
   creating a second packet comprising a header and a defined length blocks portion, wherein the defined length blocks portion comprises payload and a padding portion;
   when an amount of padding for the padding portion is less than or equal to the threshold, indicating by a pad field in the header the amount of padding for the padding portion for the second packet; and
   transmitting the second packet.

7. The method of claim 6 wherein the pad field further indicates the format of the payload in the defined length blocks portion.

8. The method of claim 6 wherein the amount indicates a number of pad words for padding the padding portion of the defined length blocks portion.

9. A method for indicating padding in a digital mobile radio system, wherein the method comprises:
   receiving a defined length data message comprising at least a short data header and a defined length blocks portion, wherein the short data header has at least a format field and a pad field, wherein the format field indicates a type of service, and wherein the pad field has a data format field and a minimum padding field for the padding of the defined length blocks portion, wherein the minimum padding field provides an indication to examine a payload pad count field of the defined length block portion when an amount of padding in the defined length blocks portion exceeds a threshold, wherein the threshold is based on a data format indicated in the data format field of the pad field;
   examining the payload pad count field of the defined length blocks portion for the amount of padding in the defined length blocks portion, if the minimum padding field indicates that the defined length blocks portion comprises the payload pad count field.

10. The method of claim 9 wherein the minimum padding field is a variable length field.

11. The method of claim 9 wherein the short data header is one defined block in length.

12. The method of claim 9 wherein a last defined length block of the defined length blocks portion comprises a cyclic redundancy check that serves as a check over the defined length blocks portion.

13. The method of claim 9 wherein the pad field is at least one of 5 bits in length and 8 bits in length.

14. The method of claim 9 wherein the format field identifies data in the defined length blocks portion having at least one of a binary data format, a BCD data format, a 7 bit character data format, an 8 bit character data format, a 16 bit character data format, and a 24 bit character data format.

15. The method of claim 14 wherein the 8 bit character data format adheres to an international standard.

16. The method of claim 9 wherein the format field indicates a short data service.

17. A method for indicating padding in a defined length blocks portion of a packet in a digital mobile radio system, wherein the method comprises:
   computing a number of blocks of payload for a packet, wherein the packet is to be sent to a receiver in the digital mobile radio system;
   computing an amount of padding for the number of blocks of payload so that the packet is of a defined length to create a packet of the defined length by adding the amount of padding to a padding portion of the packet;

comparing the amount of padding to a threshold that is based on a format for the payload;

when the amount of padding exceeds the threshold indicating the amount of padding by a payload pad count field in the padding portion of the packet; and indicating by a pad field in a header of the packet to examine the payload pad count field of the padding portion to determine the amount of padding in the padding portion of the packet.

18. The method of claim 17 wherein the amount of padding is computed with reference to the following equation:

$$\left\lfloor \left( \text{the number of blocks of payload} \times N_{\frac{bits}{block}} - N_{\frac{bits}{CRC}} \right) \div N_{\frac{bits}{word}} \right\rfloor - N_{Words}$$

wherein $N_{bits/block}$ represents a number of bits per block for a given forward error correction coding and delivery type, wherein $N_{bits/CRC}$ represents a number of bits in a cyclic redundancy check field of the packet, wherein $N_{bits/word}$ represents a number of bits in a word according to a defined format for the payload, and wherein $N_{Words}$ represents a number of words in the payload.

19. The method of claim 18 wherein the $N_{bits/CRC}$ is set to 32.

20. The method of claim 17 wherein the step of computing the number of blocks of payload further comprises considering at least one of a) the format of the payload to compute the blocks of the payload, b) a number of bits in a cyclic redundancy check field, a forward error correction coding, and a delivery type.

* * * * *